United States Patent
Akella et al.

(10) Patent No.: US 8,112,717 B1
(45) Date of Patent: Feb. 7, 2012

(54) AUTOMATIC FORMATTING OF DISPLAY SCREEN TO REFLECT PAST CORRELATIVE CHANGES TO DATA DISPLAY WINDOWS

(75) Inventors: Sujan Akella, New York, NY (US); Rembrandt Kuipers, Surrey (GB)

(73) Assignee: Thomson Reuters (Markets) LLC, New York, NY (US)

( * ) Notice: Subject to any disclaimer, the term of this patent is extended or adjusted under 35 U.S.C. 154(b) by 707 days.

(21) Appl. No.: 11/758,084

(22) Filed: Jun. 5, 2007

Related U.S. Application Data

(60) Provisional application No. 60/811,514, filed on Jun. 5, 2006.

(51) Int. Cl.
*G06F 3/048* (2006.01)
(52) U.S. Cl. .......... 715/788; 715/798
(58) Field of Classification Search .......... 715/798, 715/792, 788, 794
See application file for complete search history.

(56) References Cited

U.S. PATENT DOCUMENTS

| | | | |
|---|---|---|---|
| 6,313,854 B1 * | 11/2001 | Gibson | 715/788 |
| 6,657,647 B1 * | 12/2003 | Bright | 715/856 |
| 7,080,326 B2 * | 7/2006 | Molander et al. | 715/788 |
| 2002/0091762 A1 * | 7/2002 | Sohn et al. | 709/203 |
| 2005/0086597 A1 * | 4/2005 | Duperrouzel et al. | 715/526 |
| 2005/0131992 A1 * | 6/2005 | Goldstein et al. | 709/202 |
| 2006/0248570 A1 * | 11/2006 | Witwer | 725/135 |

OTHER PUBLICATIONS

Kandogan et al. Elastic Windows: Improved Spatial Layout and Rapid Multiple Window Operations. 1996. pp. 27-38. ACM.*

* cited by examiner

*Primary Examiner* — Omar Abdul-Ali
(74) *Attorney, Agent, or Firm* — Kelley Drye & Warren LLP

(57) ABSTRACT

A method for automatically formatting a display screen upon initialization or refresh to reflect a user's prior resizing of frames with respect to one another.

21 Claims, 1 Drawing Sheet

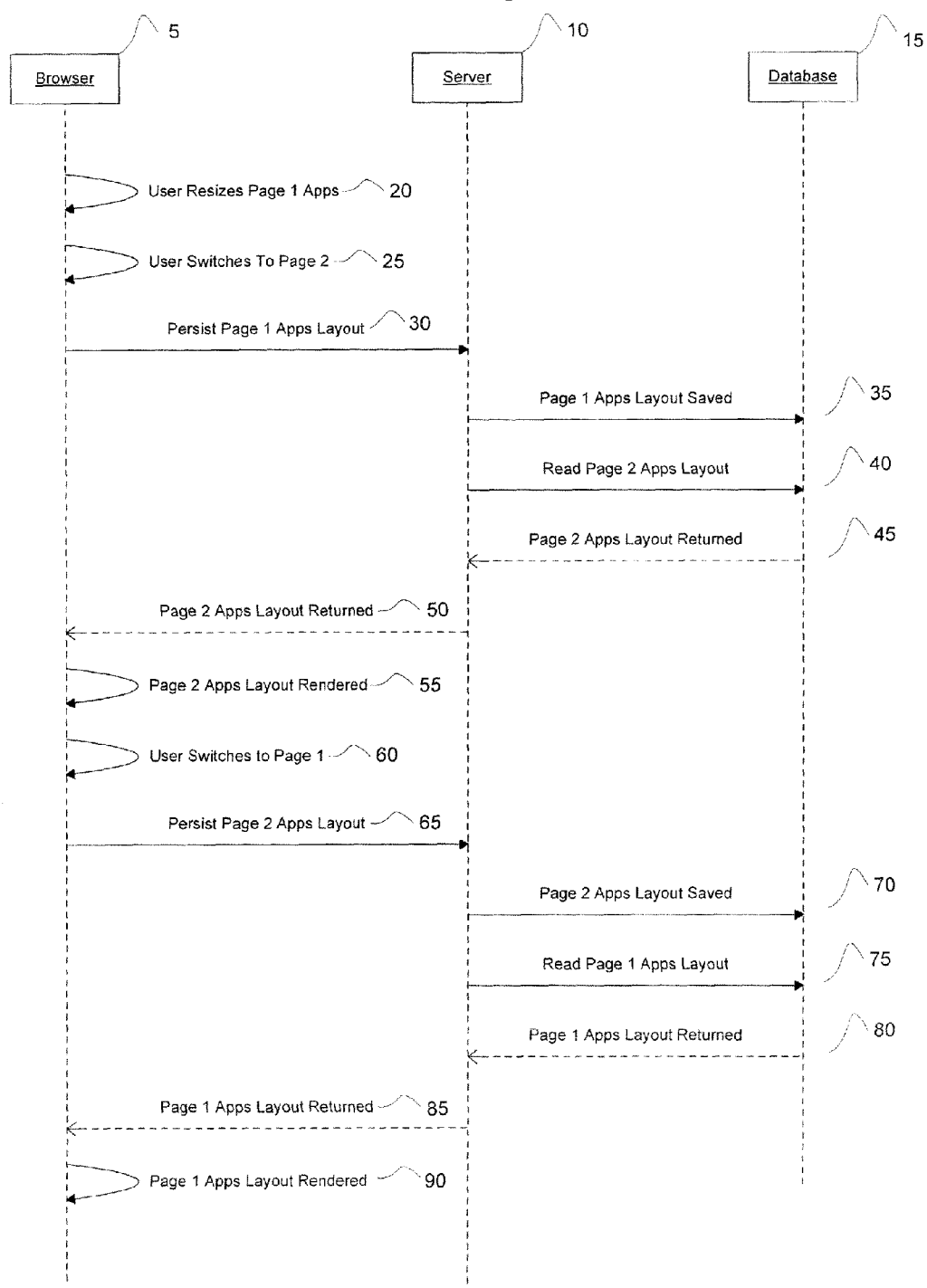

AUTOMATIC FORMATTING OF DISPLAY SCREEN TO REFLECT PAST CORRELATIVE CHANGES TO DATA DISPLAY WINDOWS

CROSS-REFERENCE TO RELATED APPLICATIONS

This application claims benefit of U.S. Provisional patent application Ser. No. 60/811,514, filed Jun. 5, 2006, the contents of which is incorporated by reference herein in its entirety.

BACKGROUND OF THE INVENTION

1. Field of the Invention

The present invention generally relates to a method for automatically formatting a display screen upon initialization or refresh to reflect a user's prior resizing of frames with respect to one another.

2. Description of the Related Art

A display screen may comprise a number of rectangular or other shaped areas in which one may run different application programs or display different data. Such areas on the display screen are known as "windows." Windows are particularly valuable in multitasking environments, allowing one to execute several programs at once and allowing one to see output from all the programs at the same time. Windows operating systems permit windows in a graphical user interface ("GUI") to be re-dimensioned, and re-positioned on the screens by either moving of the mouse, clicking on appropriate buttons, or other known input. Windows can be arranged so that they do not overlap (tiled windows) or they do overlap (overlaid windows or cascading windows).

As opposed to earlier types of client-server computing wherein each application had its own client program which served as its user interface and had to be separately installed on each user's computer, many applications today are accessed through the World Wide Web or similar web, so called "web applications" or "webapps." A webapp is an application that's accessed with a web browser over a network such as the Internet or an intranet. Webapps are popular due to the ubiquity of the browser as a client, sometimes called a thin client, and the ability to update and maintain webapps without distributing and installing software on may client computers. Webapps dynamically generate a series of web pages in a standard format supported by common browsers such as HTML/XHTML, the browser acting as the universal client. Client-side scripting in a standard language such as JavaScript is commonly included to add dynamic elements to the user interface.

Information may be displayed at the client side in a number of HTML frames, which may be independent windows or subwindows, allowing certain information to be visible while other views are scrolled or replaced (e.g., in the same window, one frame might include a navigation window, one a static banner, and one a scrollable document). That is framing in terms of the World Wide Web means an area in which there is displayed different documents or applications. The contents of frames may be hosted on the same server as the parent source, or may link in code from another website server such that these external contents are automatically displayed within the frame. Inline HTML frames such as frames within text are referred to as Iframes.

Access to materials on the World Wide Web may be improved by interface of a proxy server between the client and web server, allowing access to a resource either by connecting to a specified server or servicing the resource directly from its cache. Reverse proxy servers, that is proxy servers installed in the neighborhood of one or more webservers, may also be used to improve speed of access of materials on the web by caching static content like pictures and other static graphical content, in aiding in load distribution to several webservers and performing Secure Sockets Layer (SSL) encryption in a more accelerated manner than the webserver could do itself. The proxy server may also perform webapp processing making the client in the client-server architecture network a so-called thin client in depending primarily on the proxy server for processing activities (as opposed to a thick client were the client does as much processing as possible and passes only data required for communications and archival storage to the server).

Users often resize or reorient windows or frames in order to display data in a manner most convenient and useful for them. Unfortunately, when the user exits the system hosting such windows and frames, such desired resized and positioned windows or frames are not stored. Therefore, when the user re-enters the system and wishes to access the same applications which were previously running or displayed in the desired sized and oriented windows and frames, the user must once more resize and reposition the frames and/or windows with respect to one another. This may entail a considerable amount of time and effort, particularly when many frames and/or windows are involved.

There is a need for system and method wherein relative display areas and positions at one point in time between two or more frames and/or windows on a display screen correlative with the data and source of such data therein, can be automatically regenerated at a second point in time after termination and re-entering of the data and source of such data which were previously running in such frames and/or windows.

SUMMARY OF THE INVENTION

There is provided herein a method comprising: (a) accessing a first web page having a first frame and a second frame each displaying data from distinct separate sources, the first frame and the second frame having a spatial relationship between one another; (b) displaying the first web page; (c) modifying the spatial relationship to generate a second web page; (d) displaying the second web page; (e) storing the spatial relationship between the first frame and the second frame so as to be able to display the second web page at another point in time. Optionally, such method may further comprise the step of (f) retrieving the spatial relationship between the first frame and the second frame when a request from a user is received for the same or similar data from each of the distinct sources.

In another embodiment there is provided a method for allowing re-display of a user configured display screen layout of window, frames, and content therein, comprising: (a) storing a spatial relationship modified by a user at a first time between a first frame or window displaying content from a first source, and a second frame or window displaying content from a second source, on a multi-frame display screen; (b) redisplaying the spatial relationship between the first frame or window, and the second frame or window, when a request from the user is received a second time for the same or similar content previously displayed in the first frame or window and second frame or window.

BRIEF DESCRIPTION OF THE DRAWINGS

FIG. 1 is an exemplary state diagram illustrating the resize, switch, save return and render timing of actions relative to a browser, a server and a database as set forth in the detailed description.

DETAILED DESCRIPTION OF THE INVENTION

In embodiments of the present invention, there is disclosed a method and system for automatic formatting of a display screen to reflect past correlative changes to data display windows and frames. In a particular embodiment, such windows and/or frames in the display screen relate to information related to two or more financial information sources.

Professionals often require ex temporaneous decisions to be made based upon information which may be derived from several sources. The decision tree, and emphasis placed upon different data sources, may differ dramatically between different professionals. For example, one professional in the financial area my look more carefully at current NASDAQ parameters, and mortgage rates, than other financial data such as bond yields. Partly owing to the different weight a professional may place on each of a number of data sources, and partly owing to an individual's predilections and thought processes, a first professional may desire to size a particular window and/or frame displaying data from one data source, and place it in a manner with respect to other windows and/or frames displaying other data sources, in a much different manner than a second professional using the same, or some of the same, data sources to make the same analysis as the first professional. Unfortunately, the particular sizing and placement of windows and/or frames with respect to one another are lost upon existing one or more data sources or the system as a whole.

In one embodiment there is provided a method for allowing re-display of a user configured display screen layout of window, frames, and content therein, comprising:

(a) accessing a first web page having a first frame and a second frame each displaying data from distinct separate sources, the first frame and the second frame having a spatial relationship between one another; (b) displaying the first web page; (c) modifying the spatial relationship to generate a second web page; (d) displaying the second web page; (e) storing the spatial relationship between the first frame and the second frame so as to be able to display the second web with related content in each first and second frame at another point in time.

In another embodiment there is provided a method for allowing re-display of a user configured display screen layout of window, frames, and content therein, comprising: (a) storing a spatial relationship modified by a user at a first time between a first frame or window displaying content from a first source, and a second frame or window displaying content from a second source, on a multi-frame display screen; (b) redisplaying the spatial relationship between the first frame or window, and the second frame or window, when a request from the user is received a second time for the same or similar content previously displayed in the first frame or window and second frame or window.

Now turning to FIG. 1, there is shown a sequence schematic of a method for allowing re-display of a user configured display screen layout of window, frames, and content therein. A user employing browser 5, performs one or more manipulation of a window or frame such as resizing items on a first page or the page itself (step 20). When user switches to another page (step 25), persistence of the first page is maintained at server 10 (step 30), which after a period of time sends the layout of the first page (step 35) to a storage database 15 while the server obtains the newly desired page 2 (steps 40, 45) from data base 15, and transmits to browser 5 (step 50). Page 2 layout may be formatted in a layout previously dictated by the user and rendered back to the user in such layout (step 55) by browser 5. The user may then once more switch to content related to the first page (step 60), which would then cause the persistence of the second page layout to be sent to the server 10 and ultimately saved in database 15 (step 70). The request for page 1 content by the user (step 60) causes the server to seek the user's prior layout of information related to such content (step 75) and to retrieve the same from database 15 in step 80. Server 10 then transmits the prior user dictated layout of page 1 (step 85) and the page 1 layout is rendered (step 90).

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

We claim:

1. A method comprising: (a) receiving a first web page having a first application frame and a second application frame each application displaying current data from distinct separate sources, the first application frame and the second application frame having a spatial relationship between one another; (b) displaying the first web page; (c) obtaining a modification of the spatial relationship of each application frame with respect to one another and thereby generating a second web page; (d) displaying the second web page; (e) storing the spatial relationship between the first application frame and the second application frame and the source of the applications as a result of changing focus from said first web page to said second web page so as to be able to display the first web page with the current data at another point in time.

2. The method of claim 1 wherein the modification of the spatial relationship between the first and second application frame pertains to re-positioning frames.

3. The method of claim 1 wherein the modification of the spatial relationship between the first and second application frame pertains to re-sizing the frames with respect to one another.

4. The method of claim 1 wherein the modification of the spatial relationship between the first and second application frame pertains to both re-positioning and re-sizing the frames with respect to one another.

5. The method of claim 1 further comprising the step of: (f) displaying the second web page at another point in time based on the modified spatial relationship.

6. The method of claim 1 wherein the first web page first application frame and a second application frame both comprise financial data.

7. The method of claim 1 wherein the modification of the spatial relationship between the first and second application frame is by way of a browser.

8. The method of claim 1 wherein the stored spatial relationship between the first application frame and the second application frame relates both to the size and position of the two frames with respect to one another.

9. The method of claim 8 wherein the stored spatial relationship between the first application frame and the second application frame further relates to the relative position of the frames to the borders of a display screen.

10. The method of claim 1 wherein the spatial relationship between the first application frame and the second application frame is persisted at a server and stored in a database.

11. A method for allowing re-display of a user configured display screen layout of window, frames, and content therein, comprising: (a) storing a spatial relationship modified by a user at a first time between a first application frame or window displaying current content from a first application source, and a second application frame or window displaying current content from a second application source as a result of changing focus from said first application frame to said second application frame on a multi-frame display screen; (b) redisplaying the spatial relationship between the first application frame or window, and the second application frame or window, when a request from the user is received a second time for the same or similar content previously displayed in the first application frame or window and second application frame or window.

12. The method of claim 11 wherein the stored spatial relationship between the first and second application frame or window pertains to the positioning of the frames or windows with respect to one another.

13. The method of claim 11 wherein the stored spatial relationship between the first and second application frame or window pertains to the size of the frames or windows with respect to one another.

14. The method of claim 11 wherein the stored spatial relationship between the first and second application frame or window pertains to both to the position and size of the frames or windows with respect to one another.

15. The method of claim 11 wherein the stored spatial relationship between the first and second application frame or window further includes spatial relationships between such frames or windows and the border of a display screen.

16. The method of claim 11 wherein the first and second application frame or window comprise financial data.

17. The method of claim 11 wherein the spatial relationship is stored by way of a browser.

18. The method of claim 11 wherein the storing and re-displaying occur on the same client.

19. The method of claim 11 wherein the re-displaying second time is a time remote from said modification of said spatial relationship by said user.

20. The method of claim 11 wherein the re-displaying second time is a time proximal to said modification of said spatial relationship by said user.

21. The method of claim 11 wherein the spatial relationship stored relates to three or more application frames or windows.

* * * * *